United States Patent
Lance et al.

(10) Patent No.: US 8,307,227 B2
(45) Date of Patent: *Nov. 6, 2012

(54) DATA COMMUNICATION SYSTEM AND METHOD

(75) Inventors: Philippe Lance, Toulouse (FR); Arlette Marty-Blavier, Seysses (FR)

(73) Assignee: Freescale Semiconductor, Inc., Austin, TX (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/514,039

(22) PCT Filed: Nov. 8, 2006

(86) PCT No.: PCT/IB2006/054680
§ 371 (c)(1),
(2), (4) Date: May 7, 2009

(87) PCT Pub. No.: WO2008/056208
PCT Pub. Date: May 15, 2008

(65) Prior Publication Data
US 2010/0004828 A1    Jan. 7, 2010

(51) Int. Cl.
*G06F 1/26* (2006.01)
*H04L 25/34* (2006.01)
(52) U.S. Cl. ........................ 713/320; 375/287
(58) Field of Classification Search .................. 713/320, 713/322–324, 340, 400, 401, 501, 600; 701/45, 701/46; 375/287, 288, 293, 362, 369, 370
See application file for complete search history.

(56) References Cited

U.S. PATENT DOCUMENTS

| | | | | |
|---|---|---|---|---|
| 3,668,424 A | * | 6/1972 | Yamamoto et al. | 326/98 |
| 4,468,625 A | * | 8/1984 | Tandart et al. | 327/98 |
| 4,907,222 A | * | 3/1990 | Slavik | 370/443 |
| 4,939,443 A | * | 7/1990 | Pollmeier et al. | 323/284 |
| 5,262,949 A | * | 11/1993 | Okano et al. | 701/46 |
| 5,473,635 A | * | 12/1995 | Chevroulet | 375/287 |
| 5,760,489 A | | 6/1998 | Davis et al. | |
| 5,969,631 A | * | 10/1999 | Ammler et al. | 370/514 |
| 6,087,736 A | * | 7/2000 | Ohuchi et al. | 307/10.1 |
| 6,310,408 B1 | | 10/2001 | Hermann | |
| 6,449,545 B1 | | 9/2002 | Nitschke et al. | |
| 6,477,457 B1 | | 11/2002 | Fendt et al. | |
| 6,587,532 B1 | * | 7/2003 | Hermann | 375/376 |
| 6,980,084 B1 | * | 12/2005 | Yones | 340/10.34 |

(Continued)

FOREIGN PATENT DOCUMENTS

DE    19609290 A1    4/1997

(Continued)

OTHER PUBLICATIONS

International Search Report and Written Opinion correlating to PCT/IB2006/054680, dated Jun. 21, 2007.

(Continued)

*Primary Examiner* — Khanh Dang (57) ABSTRACT

A data communication system includes one or more data processing units and includes a central control unit. The decentralized data processing units are connected to the central control unit by data connection. The central control unit includes a synchronisation unit for outputting via the data connection an synchronisation signal to the data processing unit. The data processing unit includes a data generator for generating data and transmitting, after the synchronisation signal, data to the central control unit.

13 Claims, 4 Drawing Sheets

U.S. PATENT DOCUMENTS

| | | | |
|---|---|---|---|
| 7,487,022 B2 * | 2/2009 | Glaser | 701/45 |
| 7,576,445 B2 * | 8/2009 | Hammerschmidt | 307/10.1 |
| 2001/0031026 A1 | 10/2001 | Kohl et al. | |
| 2006/0080495 A1 | 4/2006 | Glaser et al. | |
| 2008/0183929 A1 * | 7/2008 | Gottswinter | 710/119 |

FOREIGN PATENT DOCUMENTS

| | | |
|---|---|---|
| EP | 1142209 | 12/1991 |
| EP | 0834813 B1 | 8/2004 |
| FR | 2460573 A1 | 1/1981 |
| WO | 9907580 A1 | 2/1999 |
| WO | 0038372 A2 | 6/2000 |
| WO | 2004102909 A1 | 11/2004 |

OTHER PUBLICATIONS

Application No. US12375855, "Data Communication System and Method", Filed Aug. 1, 2006.

Non-final Office Action mailed Sep. 30, 2011 for U.S. Appl. No. 12/375,855, 11 pages.

Final Office Action mailed Feb. 9, 2012 for U.S. Appl. No. 12/375,855, 17 pages.

* cited by examiner

DATA COMMUNICATION SYSTEM AND METHOD

FIELD OF THE INVENTION

This invention relates to a data communication system. The invention further relates to a central control unit. The invention also relates to a data processing unit, and to a vehicle. The invention further relates to a method for communicating data. The invention further relates to a computer program product.

BACKGROUND OF THE INVENTION

From United States Patent Application Publication US 2006/0080495, a data communication system is known. The data communication system has a central control unit, decentralized data processing units and a data connection between the central control unit and the decentralized data processing units. During the transmission, in order to request data packets, the central control unit periodically outputs synchronization pulses over the data connection to the data processing unit interface, whereupon the decentralized data processing unit transmits data packets to the central control unit. The decentralized data processing unit generates an electrical discharge pulse after the synchronization pulse but before the transmission of a first data packet, thereby counteracting an electrical charging of the data processing unit interface by the synchronization pulse.

However, a disadvantage of the data communication system described in this Patent Application Publication, is that it consumes a significant amount of power. In particular the synchronisation pulse as well as the discharge pulse consume a significant amount of power. Furthermore, a separate power supply is required to generate the synchronisation pulse.

SUMMARY OF THE INVENTION

In accordance with the present invention a data communication system, a central control unit, a data processing unit, an occupant protection system is provided, a vehicle, a method for communicating data and a computer program product as described in the accompanying claims are provided.

Specific embodiments of the invention are set forth in the dependent claims.

These and other aspects of the invention will be apparent from and elucidated with reference to the examples of embodiments described hereinafter.

BRIEF DESCRIPTION OF THE DRAWINGS

Further details, aspects and embodiments of the invention will be described, by way of example only, with reference to the attached drawings.

DETAILED DESCRIPTION OF THE PREFERRED EMBODIMENTS

Figure 1:
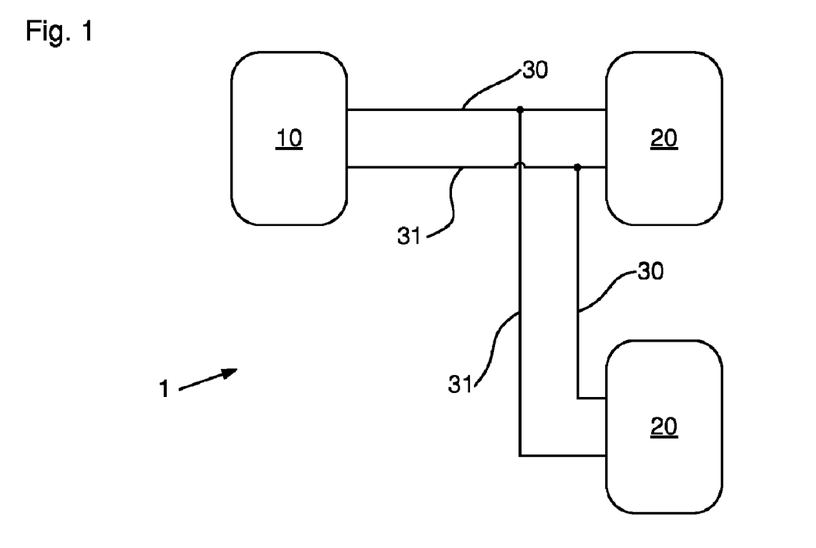
FIG. 1 schematically shows a block diagram of an example of an embodiment of a data communication system.
Figure 4:
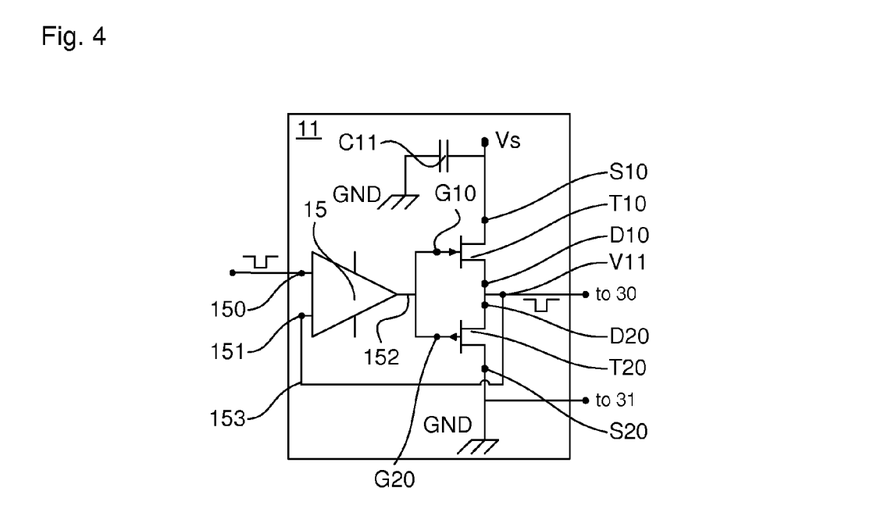
FIG. 4 schematically shows a circuit diagram of an example of a synchronisation unit.
Figure 5:
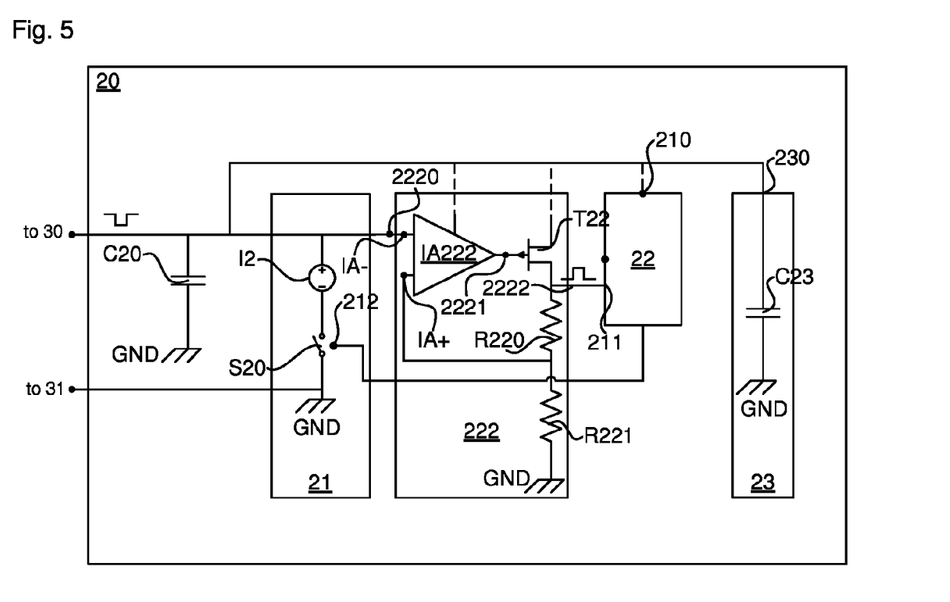
FIG. 5 schematically shows a circuit diagram of an example of an embodiment of a data processing unit.

In FIG. 1, an example of a data communication system 1 is shown. The data communication system 1 includes a central control unit 10 and one or more, in this example two, data processing units 20. The data communication system 1 further includes one or more data connections 30,31. The data connections 30,31 connect the data processing units 20 to the central control unit 10. As shown in FIGS. 4 and 5 in more detail, the data connection 30,31 may be connected to a power source Vs to provide power to the data processing units 20.

Figure 3:
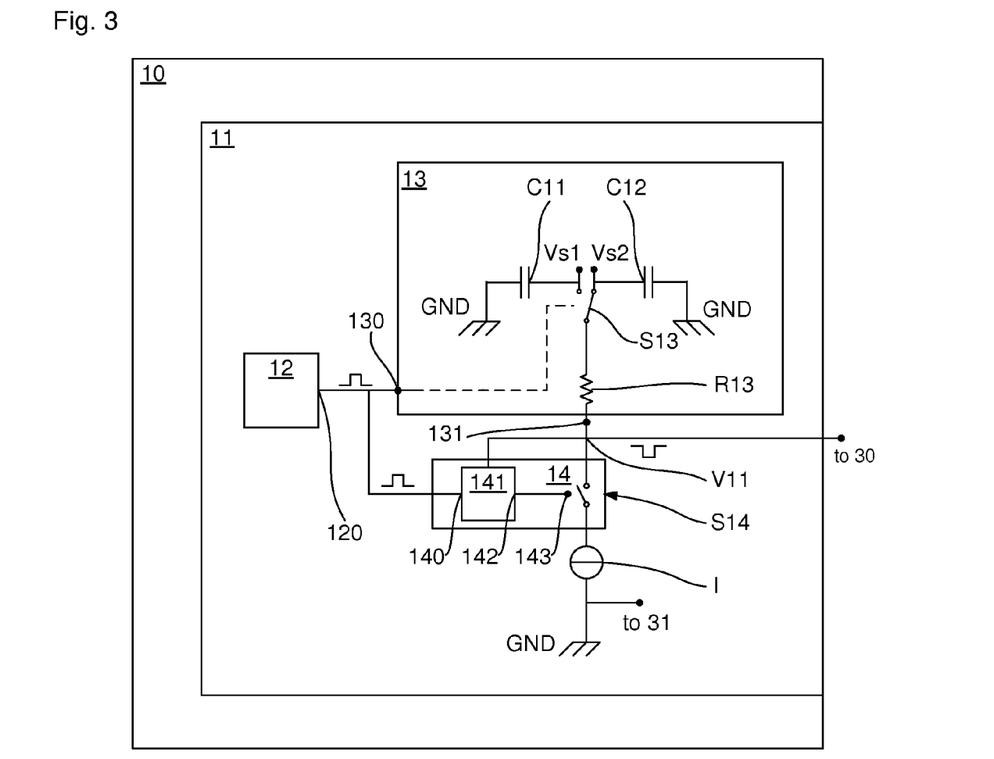
FIG. 3 schematically shows a circuit diagram of an example of an embodiment of a central control unit.

As shown in FIG. 3 in more detail, the central control unit 10 may include one or more synchronisation units 11. The synchronisation unit 11 may output via the data connection 30,31 a synchronisation signal to one or more of the data processing units 20. By means of the synchronisation signal, the time-base of the data processing units 20 can be synchronised. As shown in FIG. 5 in more detail, the data processing unit 20 may include a data generator 22. The data generator 22 can generate data and transmit the data to the central control unit 10, for example in order to transmit information obtained by a sensor or other suitable information to the central control unit 10.

The synchronisation unit 11 may output the synchronisation signal by changing an energy state of the data connection from a current energy level to a lower energy level and changing an energy state from the lower energy level back to current energy level. Thus, the energy level of the data connection is reduced when outputting the synchronisation signal. Hence, the consumption of energy by the data connection, and accordingly the power consumption of the system may be reduced. Furthermore, charging of capacitive elements, e.g. in the data connection 30,31 or in the data processing units 20, by the synchronisation signal may be prevented. Accordingly, the need to provide a discharge signal after outputting the synchronisation signal may be obviated. For example, as explained below in more detail with reference to FIG. 2, the voltage level $V_L$ of the data connection 30 may be changed from a steady state voltage $V_{DC}$ to a, lower, synchronisation signal voltage $V_{sync}$.

Figure 2:
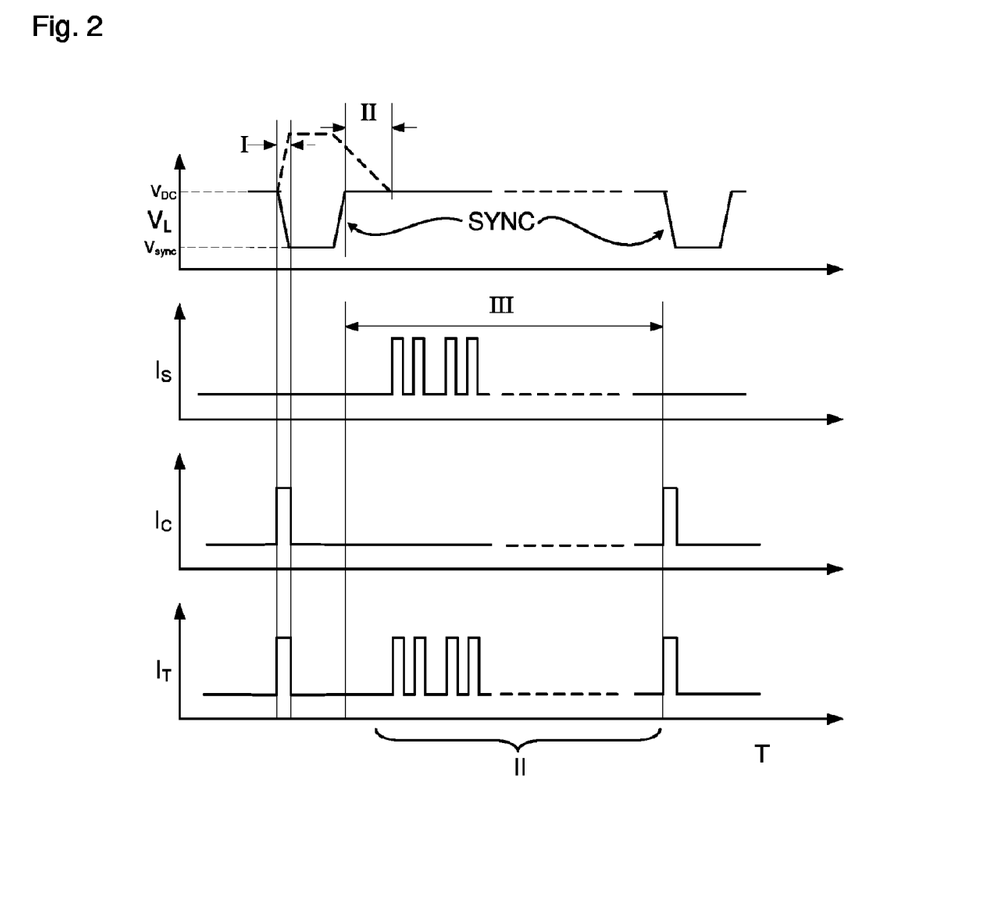
FIG. 2 schematically shows examples of graphs of signals that may be transmitted by the example of FIG. 1.

FIG. 2 schematically illustrates an example of the development (as a function of time) of the voltage $V_L$ of the data connection 30, the current $I_s$ originating from the data processing unit 20, the current $I_c$ originating from the central control unit 10 and the total current $I_T$ flowing through the data connection 30. As shown in FIG. 2, the synchronisation unit 11 may output a synchronisation signal SYNC to the data processing units 20 connected to the data connection 30,31. The synchronisation signal SYNC may, for example, be outputted periodically, such as after a period of time above 0.1 milliseconds and below 1 millisecond, such as 0.5 milliseconds or less, for instance every 0.25 milliseconds. It should be noted that, for illustrative purposes, the duration of the synchronisation signal SYNC is exaggerated in FIG. 2. As shown in the example of FIG. 2, the synchronisation signal SYNC may for example be a negative voltage pulse. In the example of FIG. 2, the negative voltage pulse is superimposed on a DC voltage level. (It should be noted, that since the voltage pulse is negative, the superposition results in a lowering of the voltage level $V_L$ of the data connection 30). The DC voltage level may for example be a DC offset voltage suitable to supply power to the data processing units 20. The voltage of the DC offset voltage may for example be in the range from 5 to 7 volts, such as 6 volts for instance. The voltage of the synchronisation signal SYNC may for example be a voltage less than the DC offset voltage for example between 5 to 7 volts less, such as 6 volts lower than the DC offset voltage. However, other voltages may also be used.

As shown in FIG. 2 with the dashed line II, when a positive synchronisation pulse would be used, and without discharging signal, the return of the voltage of the data connection 30 to the DC offset level would be delayed. The delay is caused by the charge on the data connection 30 and the time required to discharge the data connection 30 after the synchronisation signal SYNC has been sent. However, in case the energy level of the data connection is lower during outputting of the synchronisation signal SYNC than the energy level before the outputting of the synchronisation signal SYNC, e.g. in the steady state, charging of the data connection by the synchronisation signal may be prevented. Hence the need to provide a discharge signal at the end of the synchronisation can be obviated.

As shown in FIG. 2, to output the synchronisation signal SYNC, for example the energy level, e.g. the voltage $V_L$, of the data connection 30 may be lowered. To accelerate the lowering of the energy level of the data connection 30, the synchronisation unit 11 in the central control unit 10 may enable a current Ic to flow, during a period of time denoted with I in FIG. 2, through the data connection 30 at the start of the synchronisation signal. Thereby, the data connection 31 can be discharged and the lowering of the voltage level of the data connection 31 to the lower, synchronisation signal voltage level $V_{SYNC}$ can be facilitated. After the voltage of the data connection 31 has returned to the steady state voltage level $V_{DC}$, the respective data processing unit(s) 20 may transmit data, during a period of time denoted with III in FIG. 2, to the central control unit 10. As shown in the example of FIG. 2, the data processing unit 20 may transmit one or more binary signals over the data connection 30. In this example, the data processing unit 20 transmits a pulsed current $I_s$ and the binary signal is formed by the current pulse. The current pulse and/or the discharging current may for example be currents flowing from the data processing unit 20 towards the central control unit 10 or vice versa.

The central control unit 10 may be implemented in any manner suitable for the specific implementation. An example of an embodiment of a central control unit 10 is shown in FIG. 3. The central control unit 10 may, as shown in FIG. 3, include a synchronisation control unit 11.

The synchronisation unit 11 may implemented in any manner suitable for the specific implementation. The synchronisation unit 11 may for example be arranged to output the synchronisation signal by changing a voltage of the data connection from a first level, for example a DC offset voltage to a second, lower, level and back, from the second level to a third level higher than the second level. The third level may for example be the same as the first level, or be higher than the first level or be lower than the first level. As shown in FIG. 3, the synchronisation control unit 11 may for example include a timer 12, and a synchronisation signal generator 13. In the example of FIG. 3 the synchronisation signal generator 13 is connected with a signal generator input 130 to a clock signal output 120 of the timer 12. The synchronisation signal generator 13 is further connected with a generator output 131 to the data connection 30. In this example, the timer 12 periodically outputs a clock signal. Based on the clock signal received from the timer 12, the synchronisation signal generator 13 outputs a synchronisation signal at the generator output 131.

The synchronisation signal generator 13 may be implemented in any manner suitable for the specific implementation. The synchronisation signal generator 13 may, as for example shown in FIG. 3, include two or more different voltage supplies Vs1,Vs2 which are at different voltages, and a switch S13 which can connect a selected voltage supply to the generator output 131. In the example of FIG. 3, for instance, the switch S13 is connected with a first contact at a first switch side to the low voltage supply Vs1 and with a second contact at the first switch side to the high voltage supply Vs2. (For illustrative purposes, the voltage supplies Vs1,Vs2 are shown in FIG. 5 connected to ground GND via respective capacitors C11,C12.) The high voltage supply Vs2 is at a higher voltage than the low voltage supply Vs1. A contact at a second side of the switch S13, opposite to the first switch side, is connected to the generator output 131, in this example via a resistor R13. Depending on the state of the switch S13, the first contact or the second contact is electrically connected to the contact at the opposite side, and hence either the first voltage supply Vs1 or the second voltage supply Vs2 is connected to the contact at the second side of the switch, and hence to the signal generator output 131. The state of the switch S13 is controlled by the clock signal inputted at the signal generator input 130. In case the clock signal is low, the high voltage supply Vs2 is connected to the generator output 131. In case the clock signal is high, the low voltage supply Vs1 is connected to the generator output 131. Hence, the voltage of the signal generator output 131 is controlled by the clock signal and the synchronisation signal may be generated by the synchronisation signal generator 13. As illustrated in FIG. 3, the inputted signal may have a pulsed shape, and accordingly, the voltage of the signal generator output 131 may change in a pulsed manner.

As shown in the example of FIG. 3, the data communication system 1 may include a discharging unit 14. The discharging unit 14 may output a discharge signal over the data connection 30,31. The discharge signal may discharge the data connection 30,31 and/or the interface of the respective data processing unit(s) 20 connected to the data connection 30,31 over which the discharge signal is sent. Thereby the lowering of the energy level of the data connection 30,31 can be accelerated.

For instance, in case the synchronisation signal is a voltage signal, such as a voltage pulse, the voltage of the data connection 30,31 will deviate from the steady state voltage $V_{DC}$ during transmission of the synchronisation signal. The steady state voltage $V_{DC}$ may, for example, charge capacitances in the data connection 30,31 or in the data processing units 20. In the circuit diagram shown in FIG. 5, for instance, the capacitive elements are represented, for illustrative purposes, by a separate capacitor C20. However, the capacitance may also be an integral part of, for example, the data connection 30 or the data processing unit 20 and not be present as a separate element but for example caused by inherent, parasitic, capacitances. Due to the steady state voltage $V_{DC}$, the data connection 30,31 and/or the respective interfaces between the data connection 30,31 and the data processing units 20 may be charged. Accordingly, the time required to discharge the charged components delays the lowering of the voltage of the data connection to the synchronisation signal voltage $V_{SYNC}$, and hence may increase the duration of the synchronisation signal SYNC. By transmitting the discharge signal, the discharging can be accelerated and, for example, the duration of the synchronisation signal SYNC may be reduced.

The discharging unit 14 may be implemented in any manner suitable for the specific implementation. The discharging unit 14 may for example be present in the central control unit 10 or the data processing unit 20. The discharging unit 14 may for instance output a discharge signal from the central control unit 10 to the data processing unit 20 via the data connection 30,31. For instance, as shown in FIG. 3, the discharging unit 14 may be present in the central control unit 10. The discharging unit 14 may include a switch S14 which connects the data connection 30 via a current source I to a node at a voltage lower than the steady state voltage $V_{DC}$, for example, to ground GND. The discharging unit 14 shown in FIG. 3 further includes a switch control 141. The switch control 141 closes the switch S14 via a switch control input 143. The closed switch S14 allows the current source I to draw current from the data connection 30 and hence discharging the data connection 30. However, the discharging unit 14 may also be implemented in a different manner, and for example include a current source which can be switched on and off and which draws a current from the data connection 30, when switched on.

The operation of the discharging unit 14 may be coordinated with respect to the operation of the synchronisation signal generator 13. Thereby, the data connection 30 may be discharged a short period of time after the transmission of the synchronisation signal is started and the period of time available for transmission of the data from the data processing units to the central control unit may be increased. For instance, the discharging unit 14 may discharge the data connection in response to the clock signal. In the example of FIG. 3, the switch control 141 is connected to the clock 12 and can receive the clock signal via the discharging unit input 140. The switch control 141 closes the switch S14 in the discharging unit 14 in response to the clock signal. However, the discharging may also be coordinated with respect to the synchronisation signal in another manner. For instance, in the example of FIG. 3, the switch S14 may be closed in response to switching of the synchronisation signal generator 13 from the high voltage supply Vs2 to the low voltage supply Vs1.

The signal generator 11 may, as shown in FIG. 4, include a comparing unit 15. As shown in FIG. 4, a first comparing unit input 150 of the comparing unit 15 may be connected to a reference source (not shown in FIG. 4) which provides a reference signal representing the desired output voltage of the synchronisation unit 11. At the first comparing unit input 150 a pulsed reference signal may be inputted, for example with pulses at regular time intervals.

The comparing unit 15 may for example include a comparator which is connected with a first input to a signal source which provides a reference signal and which is connected with a second input to the data connection 30 and outputs a binary signal, e.g. either a positive signal or a negative signal with a constant amplitude. The comparator may for example output the positive signal in case the voltage at the first input is higher than the voltage at the second input and output the negative signal in case the voltage at the first input is lower than the voltage at the second input. In such case, in case the voltage of the data connection 30 exceeds the reference signal, the negative signal is outputted by the comparator and in case the voltage of the data connection 30 is lower than the reference signal, the positive signal is outputted by the comparator. Accordingly, outputting of the synchronisation signal and the discharging signal can be controlled.

The synchronisation unit 11 may output the discharge signal based on the sensed parameter. As shown in the example of FIG. 4, the comparing unit 15 may for instance control an output stage of the synchronisation unit 11 based on the sensed parameter. In the example of FIG. 4, the output stage includes a push-pull output stage. The control inputs of the push-pull stage are formed by the control terminals G10 and G20 of transistors T10,T20. The transistors T10,T20 connect the data connection 30 to a power supply Vs and to ground, respectively. The transistors T10,T20 are connected to each other with respective terminals D10 resp. D20 at a node V11 which is also connected to the data connection 30. A terminal S10 of a respective transistor T10 is connected to the power supply Vs and a terminal S20 of a respective transistor T20 is connected to ground. In the example of FIG. 4, an output 152 of the comparing unit 15 is connected to control inputs G10, G20 of the output stage of the synchronisation unit 11. The output signal of the comparing unit 15 controls the output stage, and hence the voltage and/or current of the data connection 30.

The transistors T10,T20 of the push-pull output stage may for example be operated in active mode. With the signal presented at the comparing unit output 152, the control terminals G10,G20 of the transistors T10,T20 can be controlled, and accordingly the voltage drop between an input terminal S10, D20 and an output terminal D10,S20 of a respective transistor T10, T20 can be regulated, as well as the current flowing between the input terminals and the output terminals. Thereby the voltage of the data connection 30 can be controlled, as well as the current flowing from the data connection 30 to ground GND via the transistor T20.

In the example of FIG. 4, the transistors T10,T20 are connected such that they form a push-pull regulator. In case the output of the comparing unit 15 increases, the voltage drop over the first transistor T10 decreases and the voltage drop over the second transistor T20 increases, and hence the voltage of the data connection 30 increases. In case the output of the comparing unit 15 decreases, the voltage drop over the first transistor T10 increases and the voltage drop over the second transistor T20 decreases. Hence the voltage of the data connection decreases. Furthermore, in case the output of the comparing unit decreases, the current through the second transistor T20 increases, and hence the data connection 30 can be discharged. Hence, the comparing unit output controls the synchronisation signal and the discharge signal simultaneously.

The synchronisation unit 11 may include a sensor for sensing a parameter of the data connection 30,31 and/or the data processing unit 20. The sensor may for example include a voltage sensor which can sense the voltage of the data connection 30 or any other type of sensor suitable to sense the desired type of parameter of the data connection 30. The synchronisation unit 11 may for instance include a circuit in which the sensor, and/or the synchronisation signal generator and/or the discharge signal generator are combined. In the example of FIG. 4, for instance, the circuit includes the comparing unit 15 and the push-pull stage. In the example of FIG. 4, a second comparing unit input 151 of the comparing unit 15 may be connected with a feedback line 153 to the data connection 30,. The comparing unit 15 can thus sense a parameter of the data connection 30 and forms a sensor. Accordingly, the second comparing unit input 151 forms a sensor input 151 and the data connection 30 is connected to the sensor input 151 to sense a parameter of the data connection 30.

The synchronisation unit 11 may for example be arranged to control the magnitude of the discharge signal and/or the synchronisation signal based on a sensed parameter, e.g. the sensed voltage, of the data connection 30. Thereby, a more accurate control of the discharge signal may be obtained and the duration and or magnitude of the discharge signal may be reduced. The amplitude of the discharge signal and/or the synchronisation signal may for example be controlled to be linearly or non-linearly dependent on the difference. The comparing unit 15 may for example include a differential amplifier which is connected with a positive input to a signal source. The signal source may provide a reference signal and be connected with a negative input to the data connection 30. Thereby, the amplitude of the signal outputted by the comparing unit 15 (which may be used to control the push-pull stage, as shown in the example) may be proportional to the difference between the amplitude of the reference signal and the voltage of the data connection 30.

In the example of FIG. 4, by means of the second comparing unit input 151, the voltage at the first data connection 30 can be sensed by the comparing unit 15. In this example, the comparing unit 15 senses the voltage of the data connection 30, which is fed back to the comparing unit input 151 via a feedback line 153. The comparing unit 15 compares the sensed voltage with a reference voltage inputted at the first inputs 150 and outputs a signal which is linearly proportional to the difference between the sensed voltage and the reference voltage. The output signal of the comparing unit 15 is inputted to the control terminals G10, G20 of the push-pull output stage and thereby the voltage of the synchronisation signal and the current of the discharge signal are controlled together and simultaneously.

In the example of FIG. 4, the voltage of the data connection 30 and the current flowing from the data connection to ground GND are controlled as a function of the voltage on the data connection 30 (and, in this example, the reference voltage). Thereby, the data connection may be discharged in a controlled manner and in short period of time, since the need to account for possible differences in voltage and/or duration of the synchronisation signal is obviated. In case, for example, the sensed voltage is below the reference voltage, the comparing unit 15 will control the control terminals G10,G20 to increase the voltage drop between the node V11 and ground GND and to decrease the voltage drop from the power supply Vs to the node V11. (For example by increasing the conductance from one terminal D10 to another terminal S10 and/or decreasing the conductance between the node V11 and ground GND) In case, for example the sensed voltage is above the reference voltage, the comparing unit 15 will control the control terminals G10,G20 to decrease the voltage drop between the node V11 and ground GND (for example by increasing the conductance from one terminal D20 to another terminal S20 and/or decreasing the conductance between the voltage supply Vs and the node V11 and hence allowing more current to flow from the data connection 30 to ground GND). The control will further increase the voltage drop from the power supply Vs to the node V11.

FIG. 5 schematically shows an example of a data processing unit 20, which may be used in the example of FIG. 1. The data processing unit 20 may include one or more other sources of data. The data processing unit 20 may, as shown in FIG. 5, include a data generator 22 which generates data to be transmitted to the central control unit 10. The data generator 22 may for example include one or more sensors. However, the data processing unit 20 may include other types of data generators, and the invention is not limited to applications in sensor systems. The sensor may for instance include an acceleration sensitive sensor, such as an acceleration or deceleration sensor which may be used in an occupant protection system in a vehicle, such as a motor vehicle. However, other types of sensor may be used, such as for instance a pressure sensor, a temperature sensor which can detect, for instance, a temperature increase in a cavity which is compressed during an accident, such as the space inside the door of a motor vehicle.

The data connections 30,31 may, as explained above, be electrical connections. For example, a data connection 30 may be set to a high voltage and the other data connection 31 may be set to a low voltage, that is: a voltage lower than the high voltage. In the example of FIG. 1, for instance a data connection 31 acts as ground (e.g. is set to zero volts) whereas the other data connection is set to a suitable supply voltage. Thereby electrical power can be supplied to the data processing units 20,21 over the same line as used to transmit the data. As shown in FIG. 5, the data connection 30 may for instance be set to a high voltage and connected to a power supply contact 210 of the data generator 22 as well as to a signal input 211 thereof.

Figure 6:
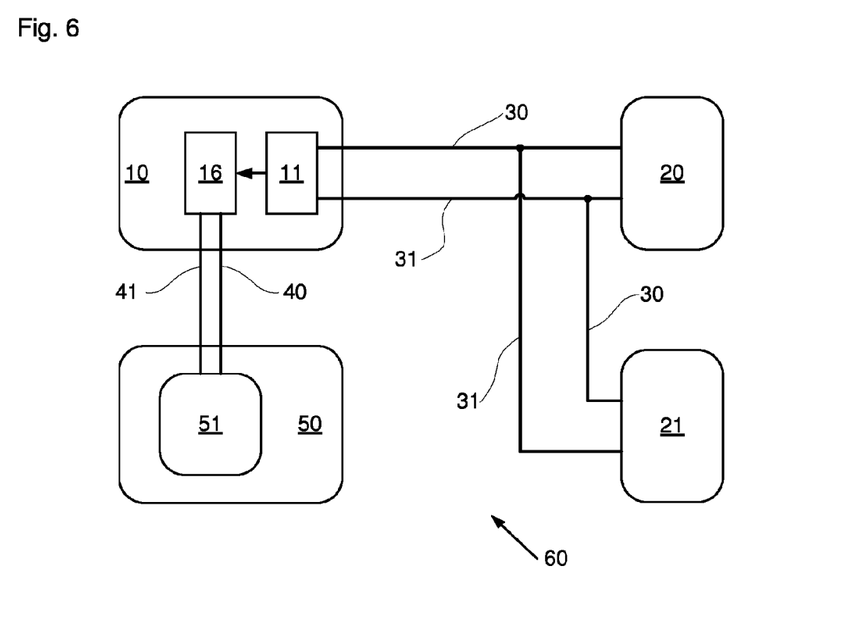
FIG. 6 schematically shows a block diagram of an example of an embodiment of a restraint system.

The data processing unit 20 may include a data transmitter 21, which in the example of FIG. 6 includes a current source 12 and a controllable switch S20. The switch S20 can alternately enable and inhibit the flow of current from data connection 30, via source 12, in this example to ground. The state of the switch is controlled via a switch control input 212 which is connected to the sensor 22. By alternately opening and closing the switch, the current through the data connection 30 can be controlled, and hence a current signal be transmitted to the central control unit 10.

The data processing unit 20 may include a signal inverter 222. The data generator 22 may be connected to the data connection 30 via the signal inverter 222. For instance, as shown in FIG. 5, the signal input 211 of the data generator may be connected to the signal inverter output 2222, and hence be indirectly connected to the data connection 30.

The signal inverter 222 may output a signal of a first level when the synchronisation signal is inputted to the signal inverter and outputting a signal of a, higher, second level when the synchronisation signal is not inputted to said inverter. The signal inverter 222 may, as for instance in the example of FIG. 5, include an inverting amplifier. The inverting amplifier IA222, may for example be connected with a negative amplifier input IA− to the data connection 30, via an inverter input 2220. A positive input IA+ of the amplifier IA222 may be connected to an amplifier output 222. In the example of FIG. 5, the positive input IA+ is indirectly connected to the amplifier output 222. The amplifier output is connected to a control input of a controllable current source, in this example a transistor T22. As shown in FIG. 5 with the dashed line, the transistor T22 may be connected with a terminal to a voltage supply, formed in FIG. 5 by the data connection 30 and with an opposite terminal to an output 2222 of the signal inverter 222. The opposite terminal is connected to the positive amplifier input IA+, via a voltage divider, which in this example includes two resistors R220, R221 in series which connect the opposite terminal to ground. A node between the resistors R220, R221 is connected to the positive amplifier input IA+.

The data processing unit 20 may include an energy storage 23 connected to the data connection 30 for storing energy. The energy storage 23 may be connected to the data generator 22. For example, in FIG. 5 the energy storage 23 is connected with a power input/output to the data connection 30 and to the power supply contact 210. The energy storage may release the stored energy to the data generator when the synchronisation signal is received by the data processing unit. For example, as shown in FIG. 5, the energy storage may include a (or more than one) capacitive element C23 which stores energy during the steady state, e.g. by being charged, and releases energy, e.g. discharges, and hence provide a current, when the supply voltage, that is the voltage over the data connection 30,31, is reduced. However, the data processing unit 20 may also include another energy storage, such as for example an inductor or other suitable elements.

The data communication system, such as the example of a data communication system 1 shown in FIG. 1, may for example be used in an occupant protection system. The occupant protection system may for instance include a restraint system or other suitable type of protection system. A restraint system generally refers to a system designed to hold a person within the body of a vehicle and limit movement during a crash, thereby reducing severity of injury. The occupant protection system may for example include a data communication system in accordance with the invention, such as the example shown in FIG. 1, and one or more actuators connected to the central control unit 10 to actuate a restraint device. The restraint device may for example include an airbag, a seat belt pre-tensioning device or other restraint device. FIG. 6 schematically shows an example of a restraint system 60. The restraint system 60 includes a restraint device 50, and an actuator 51. The actuator 51 is connected to the central control unit 10. As shown in FIG. 5, the central control unit 10 may include a controller 16 which is connected to the data connection 30,31, for example via the synchronisation unit 11 and can control the transmission of signals based on the data received from the data processing units 20,21. For instance, if the data processing units 20,21 transmit data which indicates that an accident has happened, the controller 16 may decide to output an activation signal. The central control 10 may transmit the activation signal to the actuator 51, which may for example be an airbag actuator. The actuator may actuate the restraint device 50 in response to the activation signal. For example, if the data processing unit 20 includes an acceleration sensor, the central control unit, in case the sensor or sensors senses an acceleration above a predetermined activation threshold, the central control unit 10 may transmit the activation signal. In response to the activation signal, the actuator 51 may then activate the restraint device 50, e.g. the airbag 50. In the example of FIG. 6, only one restraint device 50 and actuator 51 are shown. However, the system 60 may include more than one restraint device 50 and more than one actuator 51, which may be controlled separately by the central control unit 10.

Figure 7:
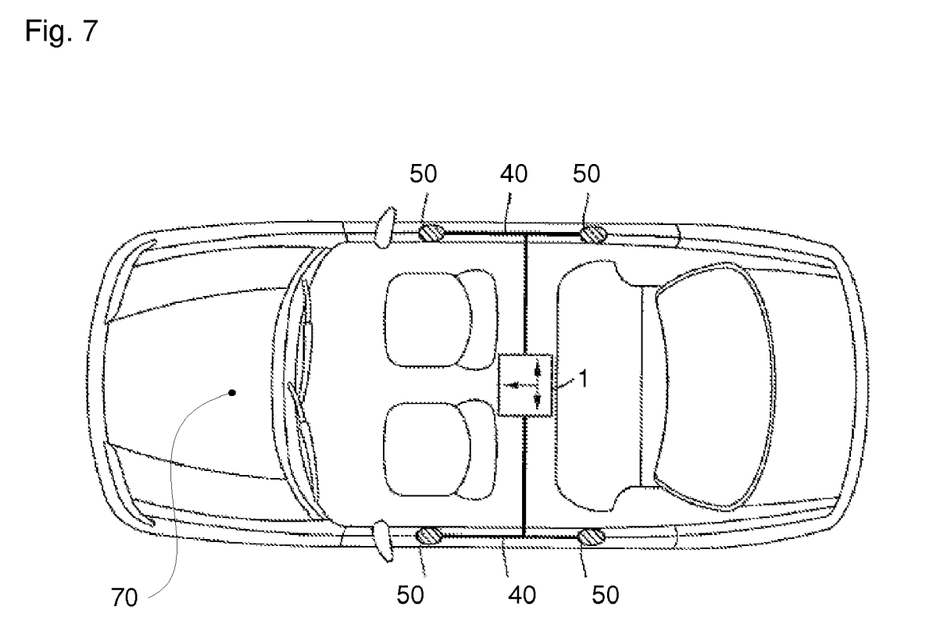
FIG. 7 schematically shows a top view of an example of a vehicle with a restraint system.

FIG. 7 shows an example of vehicle 70 provided with an occupant protection system. The example shown in FIG. 8 includes restraint devices, 50, in this example airbags, connected via a suitable data connection 40,41 to a data communication system 1, for instance the example shown in FIG. 8. As explained with reference to FIG. 5, the central control unit 10 may be arranged to control the actuator 51 based on data received from the data processing unit 20 and control actuation of the inflation of the airbags, thus protection the occupants of the vehicle 70 against impact, for example during a crash.

In the foregoing specification, the invention has been described with reference to specific examples of embodiments of the invention. It will, however, be evident that various modifications and changes may be made therein without departing from the broader spirit and scope of the invention as set forth in the appended claims. For instance, the data processing units 20 may share the connection, e.g. the data connections 30,31, to the central control unit 10. Thereby, the central control unit can send the same synchronisation signal to the data processing units 20 simultaneously. In the example of FIG. 1, as mentioned, the data processing units 20 are connected to the central control unit 10 via a bus-connection. As shown in the example of FIG. 1, for instance, the data connections 30,31 may form a bus connection between the central control unit 10 and the, decentralized, data processing units 20. The bus connection may for example be a parallel bus or a serial bus. However, other types of connections are also possible, such as for example a point-to-point connection in which each data processing unit 20 is connected by a separate connection to the central control unit 10.

Also, in the example of FIG. 5, the transistors T10,T20 are drawn as field effect transistors, of which the gate G10,G20 is used as a control terminal and the sources S10,S20 and drains D10,D20 are connected to the data connection 30, voltage supply and ground respectively and form respective signal terminals. However, other types of transistors, such as bipolar transistors, may be used and be connected in a different manner to control the current drawn from the data connection and to control the voltage of the data connection.

Also, the invention is not limited to physical devices or units implemented in non-programmable hardware but can also be applied in programmable devices or units able to perform the desired device functions by operating in accordance with suitable program code. The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection.

The central control unit 10 and/or the data processing unit 20 may be provided separately. It is also possible to provide a kit of parts, e.g. a central control unit 10 and one or more data processing units 20 which can be assembled into a data communication system 1, such as for instance into the example of a system shown in FIG. 1.

Furthermore, the devices may be physically distributed over a number of apparatuses, while functionally operating as a single device. For example, the central control unit 10 may be implemented as an arrangement of discrete components connected to each other to operate as the central control unit 10. Also, devices functionally forming separate devices may be integrated in a single physical device. For example, the electrical circuit shown in FIG. 3 can be implemented in a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:
1. A data communication system, including:
   a data processing unit;
   a central control unit;
   a data connection connecting said data processing unit to said central control unit;

a power source at said central control unit to provide power to said data processing unit over said data connection;

wherein said central control unit includes a synchronisation unit for outputting via said data connection a synchronisation signal to said data processing unit by changing the voltage of said data connection from a steady state voltage level to a second non-zero voltage level, the absolute value of the second voltage level being smaller than the absolute value of said steady state voltage level, said synchronisation signal not associated with a corresponding discharging of said data connection subsequent to outputting said synchronisation signal; and wherein said data processing unit includes a data generator for generating data and transmitting said generated data to said central control unit as a pulsed current in response to determining said voltage of the data connection has returned to the steady state voltage level following said synchronisation signal.

2. A data communication system as claimed in claim 1, wherein said data processing unit includes an energy storage connected to said data connection and to said data generator for releasing stored energy to the data generator when said synchronisation signal is received by the data processing unit.

3. A data communication system as claimed in claim 1, wherein said data processing unit includes a signal inverter connected to said data connection, said signal inverter outputting a signal of a first level when said synchronisation signal is inputted to said signal inverter and outputting a signal of a second level when said synchronisation signal is not inputted to said inverter.

4. A data communication system as claimed in claim 2, wherein said data processing unit includes a signal inverter connected to said data connection, said signal inverter outputting a signal of a first level when said synchronisation signal is inputted to said signal inverter and outputting a signal of a second level when said synchronisation signal is not inputted to said inverter.

5. A data communication system as claimed in claim 1, wherein said data processing unit includes at least one sensor, selected from a group consisting of an acceleration sensitive sensor and a pressure sensor.

6. A data communication system as claimed in claim 1, including at least one actuator unit connected to the central control unit, and wherein said central control unit is arranged to control said at least one actuator unit based on data received from said data processing unit.

7. An occupant protection system, including a data communication system as claimed in claim 6, and at least one occupant protection device connected to said central control unit, wherein said central control unit is arranged to control said occupant protection device based on data received from data processing unit.

8. A vehicle provided with an occupant protection system as claimed in claim 7.

9. A method for communicating data in a data communication system, said system including a data processing unit, a central control unit, and a connection connecting said data processing unit to said central control unit, the method comprising:

providing via said data connection power to said data processing unit;

periodically outputting by said central control unit a synchronisation signal over the data connection to the data processing unit interface by changing the voltage of said data connection from a steady state voltage level to a second non-zero voltage level, the absolute value of the second voltage level being smaller than the absolute value of said steady state voltage level, said synchronisation signal not associated with a corresponding discharging of said data connection subsequent to outputting said synchronisation signal;

transmitting by said data processing unit data to the central control unit as a pulsed current in response to determining said voltage of the data connection has returned to the steady state voltage level following said synchronisation signal.

10. The method of claim 9, wherein said data processing unit includes an energy storage connected to said data connection and to said data generator for releasing stored energy to the data generator when said synchronisation signal is received by the data processing unit.

11. The method of claim 9, wherein said data processing unit includes at least one sensor selected from a group consisting of an acceleration sensitive sensor and a pressure sensor.

12. The method of claim 9, wherein said central control unit is coupled to at least one actuator unit, and wherein said central control unit is arranged to control said at least one actuator unit based on data received from said data processing unit.

13. The method of claim 9 wherein said at least one actuator unit is coupled to at least one occupant protection device, and wherein said central control unit is arranged to control said occupant protection device based on data received from said data processing unit.

* * * * *